United States Patent [19]

Havinga et al.

[11] Patent Number: 5,380,807
[45] Date of Patent: Jan. 10, 1995

[54] ELECTRICALLY CONDUCTIVE ALTERNATING COPOLYMER AND METHOD OF PREPARING SUCH A COPOLYMER

[75] Inventors: Edsko E. Havinga, Eindhoven; Wolter Ten Hoeve; Hans Wijnberg, both of Groningen, all of Netherlands

[73] Assignee: U.S. Philips Corporation, New York, N.Y.

[21] Appl. No.: 2,432

[22] Filed: Jan. 8, 1993

[30] Foreign Application Priority Data

Jan. 15, 1992 [EP] European Pat. Off. ............ 92200097

[51] Int. Cl.[6] ..................... C08G 16/00; C08G 12/00
[52] U.S. Cl. ..................... 526/257; 526/256; 526/259; 526/268; 528/229; 252/500
[58] Field of Search ............... 526/257, 259, 268, 256; 252/500; 528/229

[56] References Cited

FOREIGN PATENT DOCUMENTS 3246319 6/1984 Germany .

OTHER PUBLICATIONS

Ew Neuse et al (1975) Macromal 8(6), 730–734.
CA101(18): 15 2542v [Naarman et al DE 3246319A1 (Jun. 1984)].
"Polymer Superpolyamides" Gauger et al, Chemical Abstracts, vol. 75, No. 10 Sep. 6, 1971, (Abstract) No. 64331q.
"Amides and Thioamides of Squaric Acid" Ehrhardt et al, Chemical Abstracts vol. 87, No. 19, Nov. 7, 1977 (Abstract) No. 151727q.
"Polar Polyamides" Manecke et al, Chemical Abstracts, vol. 71, No. 14, Oct. 6, 1969, (Abstract) No. 61825K.
"Squaric Acid-1,3-Polyamides" Manecke et al, Chemical Abstracts, vol. 83, No. 4, Jul. 28, 1975, (Abstract) No. 28639C.
"Poly(Squaryl Amides)" Neuse et al, Chemical Abstracts, vol. 81, No. 24, Dec. 16, 1974 (Abstract) No. 152677M.
Chemical Abstracts, vo. 71, 1969, Abstract No. 81344F.
"Introduction to Solid State Physics" 5th Edition, John Wiley & Sons 1976. p. 210.
"New Alternating Conductive Heteropolymers" Kowalik et al, Synthetic Metals, 41–43 (1991) 435–438.
"Light Absorption of Organic Colorants" J. Fabian et al, Springer Verlag, Berlin, 1980, p. 189.
Chemical Abstracts, vol. 76, 1972, Abstract No. 72434M.

Primary Examiner—Mark Nagumo
Attorney, Agent, or Firm—Ernestine C. Bartlett

[57] ABSTRACT

Polycondensation of, for example, squaric acid with a benzodihydropyrrole, benzodithiazole, neocuproine, terthienyl or an aromatic diamine gives a semiconductive alternating copolymer having a small band gap. It is alternatively possible to use croconic acid or 5,6-dihydroxy-5-cyclohexene-1,2,3,4-tetraone instead of squaric acid. An alternating copolymer of croconic acid and a methyl-substituted benzodithiazole has the following repetitive unit:

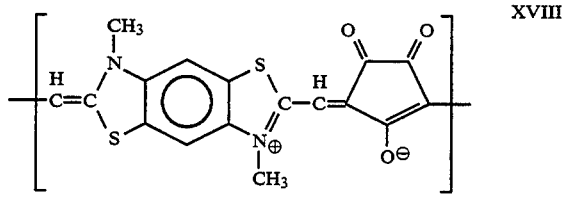

28 Claims, 3 Drawing Sheets

XVI

XVII

I

II

III

IVA

IVB

VA

VB

VC

VI

VII

VIII

IX

X

XI

XII

XIII

XIV

XV

XVI

XVII

ELECTRICALLY CONDUCTIVE ALTERNATING COPOLYMER AND METHOD OF PREPARING SUCH A COPOLYMER

FIELD OF THE INVENTION

The invention relates to a new group of intrinsically electrically conductive alternating copolymers.

The invention also relates to a method of preparing such polymers.

The invention further relates to the application of such copolymers.

BACKGROUND OF THE INVENTION

Organic polymers are generally electrical insulators and therefore they are used as insulating material in electrical and electronic components. It is known that the polymer obtains electrically conductive properties if it contains a poly-conjugated bond system of, for example, double bonds, triple bonds, aromatic or hetero-aromatic rings. Said conductivity is termed intrinsic conductivity. Examples of such polymers are polyacetylene, polythiophene and polypyrrole. In general, the conductivity of these polymers is low because these polymers are semiconductors having a relatively large band gap of 1.5–4 eV. The conductivity can be increased by (electro)chemically oxidizing or reducing the polymer. Said oxidation or reduction treatment is termed doping. By oxidation p-type conductors are formed; by reduction n-type conductors are formed. In the oxidation or reduction treatment, charge carriers are formed on the polymer chains, which charges are compensated for by oppositely charged counterions. The expression "alternating copolymer" is to be understood to mean a polymer which is composed of two different monomers which are alternately incorporated in the polymer chain. In general, polymers are cheap and can be readily processed, so that it is attractive to use conductive polymers in conductive and semiconductive structures in (integrated) electronic circuits, electrodes for batteries, antistatic coatings and electromagnetic protective layers.

A conductive alternating copolymer is known from an article by J. Kowalik et al., Synthetic Metals, 41–43 (1991) 435–438. In said article, a description is given of a semiconductive alternating copolymer on the basis of benzoquinone and pyrrole which are reacted to form poly(2-pyrrolyl-1,4-benzoquinone). The polymer obtained is p-type semiconductive and "disordered" and is produced by oxidative polymerization of pyrrole and benzoquinone. The band gap of the polymer formed is not mentioned in said article.

A disadvantage of the known method is the presence of an oxidizing agent, namely p-chloranil, during the polymerization reaction, which causes the polymer obtained to be doped and p-type conductive. It is impossible or very difficult to obtain the undoped, i.e. intrinsically conductive polymer, from said polymer. A further disadvantage is the "disordered" polymer structure which adversely affects the conductivity.

SUMMARY OF THE INVENTION

It is an object of the invention to provide, inter alia, a new group of electrically (semi)conductive alternating copolymers which have a band gap of maximally 1.5 eV and which can be obtained by means of a simple condensation polymerization (polycondensation) process which, in addition, initially yields an undoped copolymer.

A further object of the invention is to provide a method of preparing such copolymers without using an oxidizing agent.

According to the invention, this object is achieved by an alternating copolymer which is characterized in that the (semi)conductive copolymer can be obtained by reacting an acceptor monomer unit A having an unsaturated ring structure which is substituted with at least two double-bonded oxygen atoms and at least one hydroxy group, with a donor monomer unit D formed by a homo or heterocyclic aromatic compound comprising at least two active hydrogen atoms, a polycondensation reaction taking place in the presence of a solvent, thereby forming said alternating (semi)conductive copolymer. The term "acceptor" is to be understood to mean a unit which is capable of accepting a negative charge, and the term "donor" is to be understood to mean a unit which is capable of donating a negative charge. In this connection, the expression "active hydrogen atom" is to be understood to mean a hydrogen atom which can be readily separated from the monomer during the polycondensation reaction. Examples of donor monomer units D comprising at least two active hydrogen atoms are given below. By virtue of the polycondensation reaction a strictly alternating and ordered structure of acceptors and donors ... ADADADA ... is obtained, the choice of the monomer units A and D resulting in the formation of a poly-conjugated bond system. The polymers obtained have a small to very small band gap, which leads to a substantial increase of the intrinsic conductivity. Said intrinsic conductivity, i.e. conductivity obtained without doping, is obtained at room temperature.

Suitable acceptor monomer units A are squaric acid (3,4-dihydroxy-3-cyclobutene-1,2-dione; see formula I of FIG. 1), croconic acid (4,5-dihydroxy-4-cyclopentene-1,2,3-trione; see formula II of FIG. 1 ) and 5,6-dihydroxy-5-cyclohexene-1,2,3,4-tetraone (see formula III of FIG. 1).

Suitable donor monomer units D are compounds having (5-6-5) or (6-6-6) heterocyclic ring systems which are, for example, used in dye chemistry. A few examples thereof can be found in J. Fabian et al., "Light Absorption of Organic Colorants", Springer Verlag, Berlin, 1980, page 189. In said publication, these compounds are used to prepare biscyanine dyes. The general class of said suitable donor monomers D is shown in formulae IVA and IVB and VA, VB and VC in FIG. 2. In said Figure, $X_1$ represents an —NR— group; $X_2$ represents an O—, S— or Se atom or an —NR—, —CR=CH—, —CHR—CH$_2$— or —C(alkyl)$_2$—group and $X_3$ represents a —CR= or —N=group. In said FIG., $X_1$ may also represent an S- or O-atom, where $X_2$ represents an S-atom or a —CR=CH—group and $X_3$ has the above-mentioned meaning. R represents an H-atom or an alkyl or alkoxy substituent having 1-18 C-atoms. These compounds have an extensive, conjugated structure and two active hydrogen atoms which react, during the polycondensation reaction, with the OH groups of the acceptor monomer units, such as squaric acid. A few special examples are shown in formulae VI and VII of FIG. 3.

The substituents $R_1$ and $R_2$ of the benzodihydropyrrole in accordance with formula VI of FIG. 3 denote a $C_1$–$C_{18}$ alkyl group such as a methyl, butyl, or octadecyl group. The substituents $R_3$ and $R_4$ of the benzodithiazole in accordance with formula VII of FIG. 3 also denote a $C_1$-$C_{18}$ alkyl group such as a methyl, n-heptyl, n-dodecyl or n-octadecyl group. By virtue of the choice of the substituents R, those skilled in the art can widely vary the properties of the final copolymer, such as solubility, processibility and conductivity. A special example of a compound in accordance with formula VC of FIG. 2 is neocuproine (formula VIII of FIG. 3).

Another suitable donor monomer D is azulene (an aromatic 5-7 ring) which may or may not be substituted with, for example, an alkyl group.

Other suitable donor monomers D are thiophene oligomers such as bithienyl and terthienyl (formula IX of FIG. 3). The thiophene ring may be substituted with a group $R_5$ which is a $C_1$—$C_{18}$ alkyl group or a $C_1$-$C_{18}$ alkoxy group.

Another class of suitable donor monomers D is that of the aromatic diamines. The general formula is shown in formula X of FIG. 4. In said formula, Ar denotes an aromatic core and $R_6$ and $R_7$ denote an H-atom or a $C_1$-$C_{18}$ alkyl group. A few examples of the aromatic core Ar are shown in formulae XI, XII, and XIII of FIG. 4. In said formulae $R_8$ and $R_9$ represent an H-atom or a $C_1$-$C_{18}$ alkyl group; $X_1$ represents a —N= or —CR=group and $X_2$ and $X_3$ represent an —NH— or an —N(alkyl)-group or an S—, Se— or O-atom. The alkyl group contains 1-18 carbon atoms. R represents an H-atom or an alkyl or alkoxy substituent containing 1-18 carbon atoms. Representatives thereof are, for example, p-phenylene diamine, 3,6-diamino acridine (formula XIV of FIG. 4) and thionine (formula XV of FIG. 4). The polycondensation product of diamines and, for example, squaric acid surprisingly gives an electrically conductive polymer; after all, the polymer formed is a polyamide which, as a class, is known as an insulator.

An example of an alternating copolymer in accordance with the invention is the polycondensation product of squaric acid (formula I of FIG. 1) and the compound in accordance with formula VI of FIG. 3, where $R_1$ and $R_2$ represent an n-octadecyl group (n—$C_{18}H_{37}$). The polymer formed has formula XVI of FIG. 5 as the repeating unit. The squaric acid unit is negatively charged and serves as the charge acceptor. The benzo(1,2,4,5)bis(N-octadecyl-2-methyl-3-bis-methyldihydropyrrole) unit is positively charged and serves as the charge donor. The alternating sequence of donor units and acceptor units in combination with an extensive conjugated system gives an intrinsically conductive "self-doped" polymer. The conductivity of the polymer in accordance with formula XVI of FIG. 5 is $3.10^{-5}$ S/cm at room temperature and the band gap is 1.0 eV. The polymer can be readily dissolved in various solvents, such as chlorobenzene. Instead of octadecyl groups, other alkyl groups, such as the methyl, n-heptyl and n-dodecyl group, can be chosen for $R_1$ and $R_2$. In general, the solubility of the polymer in solvents increases as the length of the alkyl groups increases.

Another example of an alternating copolymer in accordance with the invention is the polycondensation product of croconic acid (formula II of FIG. 1) and the compound in accordance with formula VII of FIG. 3, where $R_3$ and $R_4$ represent a methyl group. The polymer formed has formula XVII of FIG. 5 as the repetitive unit. The croconic acid unit is negatively charged and serves as the charge acceptor. The benzo(1,2,4,5-)bis(N-methyl-2-methylthiazole) unit is positively charged and serves as the charge donor. This "self-doped" polymer in accordance with formula XVII of FIG. 5 has a conductivity of $10^{-5}$ S/cm at room temperature and of $2.5 \cdot 10^{-3}$ S/cm at 250° C. The band gap of this polymer is 0.5 eV and, hence, this polymer has semiconductive properties. Instead of methyl groups, other alkyl groups such as the n-heptyl-, the n-dodecyl- and the n-octadecyl group can be chosen for $R_3$ and $R_4$.

In accordance with the invention, squaric acid, croconic acid and 5,6-dihydroxy-5-cyclohexene-1,2,3,4-tetraone (formula III of FIG. 1) can also be copolymerized using neocuproine (formula VIII of FIG. 3), terthienyl (formula IX of FIG. 3) and 3,6 diamino acridine (formula XIV of FIG. 4). Also in this case polycondensation leads to the formation of electrically conductive alternating copolymers, the compounds in accordance with formulae VIII, IX and XIV serving as the donor unit in the polymer chains.

The object of providing a method of preparing an alternating copolymer is achieved in accordance with the invention by a method which is characterized in that equimolar quantities of bifunctional acceptor monomer units A and bifunctional donor monomer units D are mixed in a solvent and polymerized by polycondensation, thereby forming the alternating copolymer comprising repeating unit AD. As the acceptor monomer unit A a compound having an unsaturated ring structure is used which is substituted with at least two double-bonded oxygen atoms and at least one hydroxy group. As the donor monomer unit D a homo or heterocyclic aromatic compound having at least two active hydrogen atoms is used. Examples of the monomer units A and D have been mentioned above. The polycondensation reaction is carried out in a suitable solvent such as propanol, butanol, toluene or dimethyl sulphoxide.

In general, the alternating copolymers manufactured in accordance with the above method exhibit great thermal stability. In most of said copolymers no change can be observed after heating to 300° C. in air. Consequently, the sensitivity to oxygen is very small.

The conductivity of the alternating copolymers in accordance with the invention can be increased by means of dopants which are known per se. Dopants which are suitable for obtaining p-type conduction are, for example, $I_2$, $AsF_5$, $SbF_5$, $HBF_4$, perchlorate, sulphonate, $SO_3$ and $FeCl_3$. With certain copolymers p-doping causes the absorption band to pass to the infrared portion of the spectrum. As a result, said copolymers become colourless. As semiconductive polymers are available, circuits can be manufactured which can be used in electronic devices. Also conductor tracks can be manufactured from the alternating copolymer in accordance with the invention and form an alternative to metal conductor tracks.

The alternating copolymers in accordance with the invention can also be used in antistatic layers or electromagnetic protective layers by dissolving the copolymer in question in a suitable solvent and, subsequently, providing it on the desired substrate by means of, for example, spin coating.

It is noted that in German Patent Application DE-A-3246319, a description is given of the preparation of a copolymer of pyrrole and squaric acid by anodic oxidation of a solution of said compounds in the presence of a conducting salt. The polymer obtained is p-doped and also contains the anion of the conducting salt as the counterion. By anodic oxidation, squaric acid is incorporated in the polypyrrole formed. In this manner no strictly alternating copolymer is formed but a block copolymer which, in addition to a sequence of pyrrole units, comprises squaric acid units, or a homopolymer is formed which consists of pyrrole doped with squaric acid.

BRIEF DESCRIPTION OF THE DRAWINGS

The invention will be explained in greater detail by means of exemplary embodiments and drawings, in which.

DETAILED DESCRIPTION OF THE PREFERRED EMBODIMENTS

Figure 1:
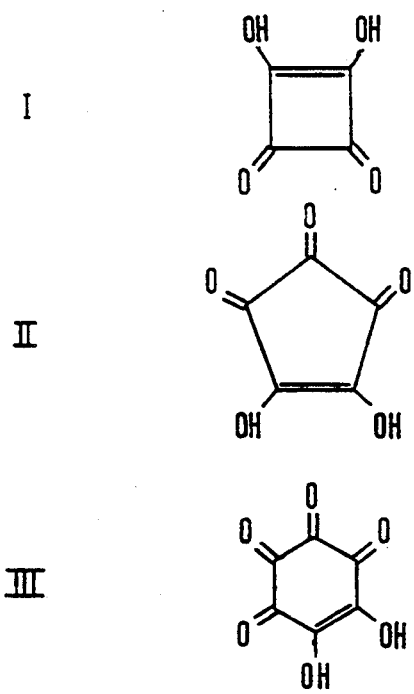
FIG. 1 represents formulae I, II and III of monomer units A which can be used as acceptor units in alternating copolymers in accordance with the invention.
Figure 2:
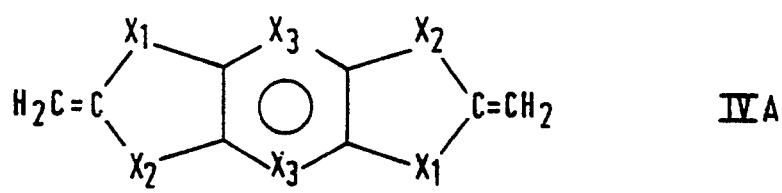
FIG. 2 represents formulae IV and V of monomer units D which can be used as donor units in alternating copolymers in accordance with the invention.
Figure 2:
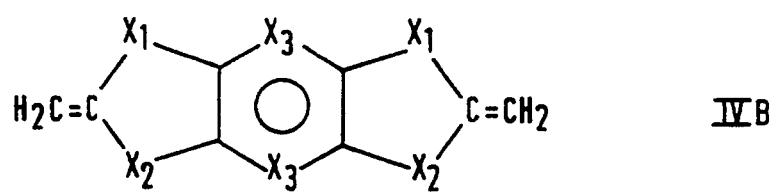
Figure 2:
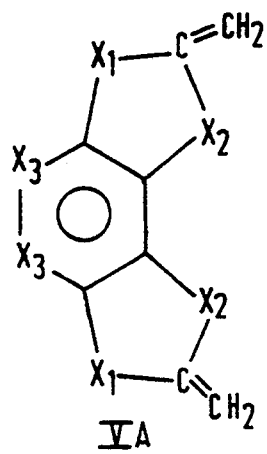
Figure 2:
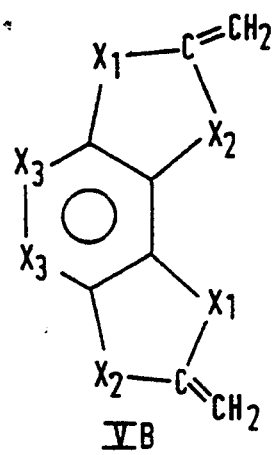
Figure 2:
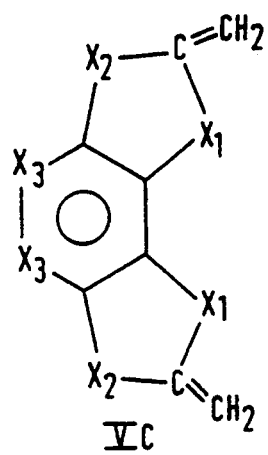
Figure 3:
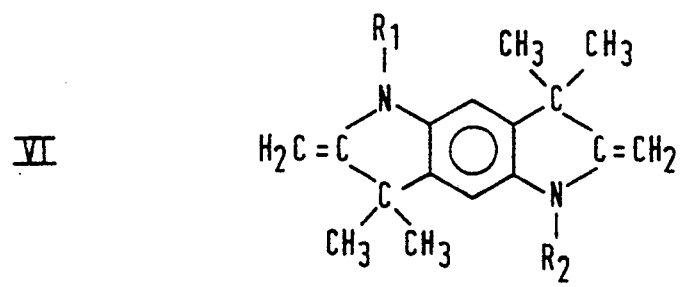
FIG. 3 represents formulae VI, VII, VIII and IX of a few special examples of monomer units D which can be used as donor units in alternating copolymers in accordance with the invention.
Figure 3:
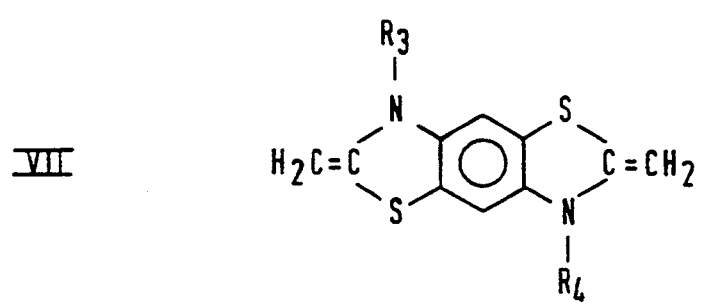
Figure 3:
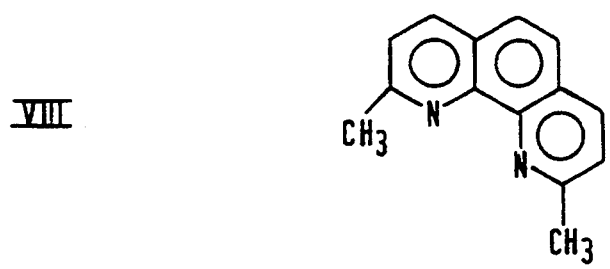
Figure 3:
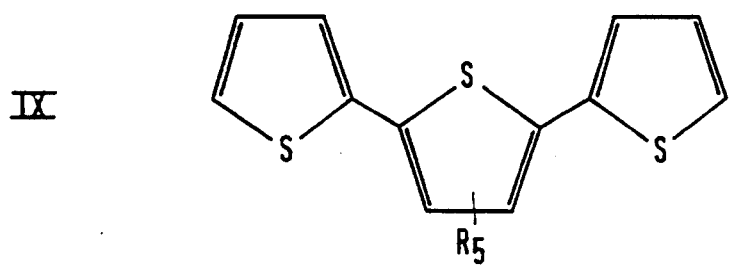
Figure 4:
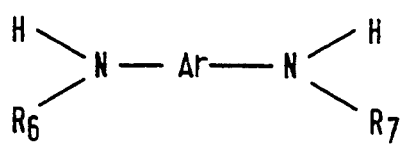
FIG. 4 represents formulae X, XI, XII, XIII, XIV and XV of aromatic diamines which can be used as donor monomer units D in alternating copolymers in accordance with the invention.
Figure 4:
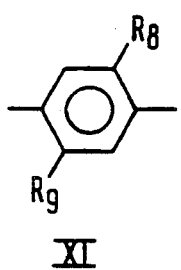
Figure 4:
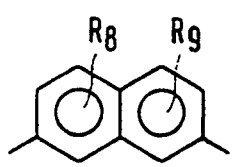
Figure 4:
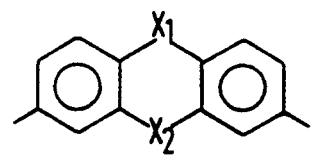
Figure 4:
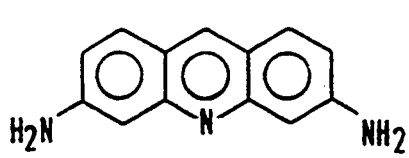
Figure 4:
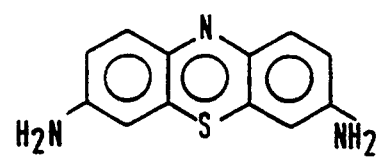

A. Preparation of a compound in accordance with formula VI, where $R_1 = R_2 = n-C_{18}H_{37}$ The compound in accordance with formula VI of FIG. 3 is prepared using a benzodipyrrole and stearyl-p-chlorobenzene sulphonate. Said dipyrrole is prepared according to the method described in Chemical Abstracts, Vol. 76, 1972, abstract No. 72434m, where it is indicated by formula III. The stearyl-p-chlorobenzene sulphonate is prepared from p-chlorobenzene sulphonchloride and stearyl alcohol. A mixture of 99 grams of stearyl-p-chlorobenzene sulphonate, 18 grams (75 mmol) of said dipyrrole and 100 ml of chlorobenzene are heated for three hours at a temperature of 120° C.-140° C. A quantity of 100 ml of chlorobenzene is added to the paste formed, thereby forming a suspension. Said suspension is heated at a temperature of 120° C.-130° C. for 16 hours and then cooled, after which 200 ml of toluene are added. The solid is filtrated by vacuum filtration after which said solid is stirred with 250 ml of toluene and then filtered again. The solid obtained is stirred with a mixture of 16 grams of NaOH, 500 ml of water and 500 ml of toluene for 5 hours after which all of the solid has dissolved. The liquid layers are separated and the organic layer is washed with 500 ml of water, after which said layer is dried over $Na_2SO_4$ and evaporated. The residue is crystallized from 500 ml of 96% ethanol thereby forming 13.75 grams (18,48 mmol) of the desired product VI, i.e. benzodihydropyrrole, where $R_1 = R_2 = n-C_{18}H_{37}$.

B. Preparation of Alternating Copolymer in Accordance with Formula XVI

A mixture of the benzodihydropyrrole in accordance with formula VI (2.40 grams, 3.23 mmol) which is prepared according to the above method, squaric acid (370 mg, 3.25 mmol), 150 ml of n-butanol, 100 ml of toluene and 3 drops of quinoline is refluxed for 20 hours while removing water by means of azeotropic distillation. After the mixture has cooled, it is filtered off by suction, after which the solid is washed with toluene. After drying at 90° C. the alternating copolymer in accordance with formula XVI thus obtained weighs 1.76 grams.

The conductivity of said copolymer in accordance with formula XVII, measured on a film by means of a four-point measurement (also termed potential-probe measurement) is $3.10^{-5}$ S/cm. The band gap is 1.0 eV and is determined by the threshold of the continuous optical absorption in the near infrared (see C. Kittel, Introduction to Solid State Physics, 5th ed., John Wiley and Sons, 1976, page 210). The absorption spectrum is measured on a thin layer of the polymer on a glass plate, said polymer being provided from a solution in chlorobenzene.

EXAMPLE 2

A. Preparation of the Salt of the Compound in Accordance with Formula VII, where $R_3 = R_4 = CH_3$.

The salt of the compound in accordance with formula VII of FIG. 3 is prepared according to the method described in Chemical Abstracts, Vol. 71, 1969, abstract No. 81344f, where it is indicated by formula III (dithiazole salt of methyl sulphate). In this form the compound is used in the polycondensation reaction with croconic acid.

B. Preparation of Alternating Copolymer in Accordance with Formula XVII

Figure 5:
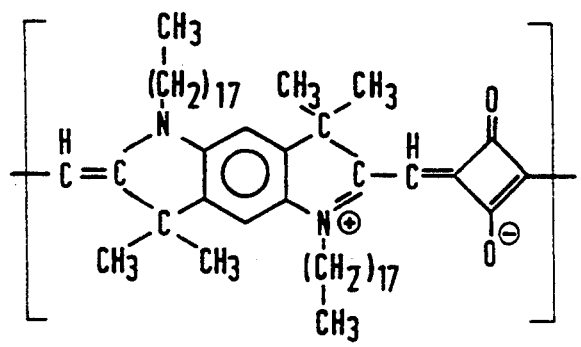
FIG. 5 represents formulae XVI and XVII of repetitive units of representatives of electrically conductive alternating copolymers in accordance with the invention.
Figure 5:
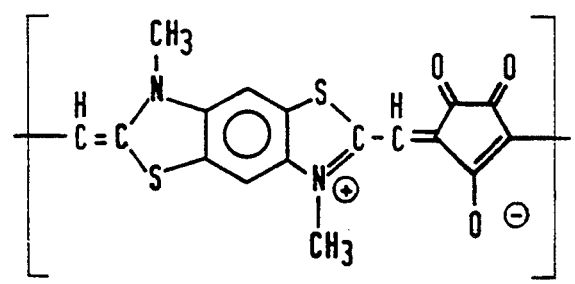

A mixture of 324 mg (2.0 mmol) of croconic acid-monohydrate, 945 mg (2.0 mmol) of the above-mentioned dithiazole salt, 30 ml of n-propanol, 800 mg of pyridine and 30 ml of dimethyl sulphoxide are refluxed for 3 hours. After evaporation a residue is obtained which is further concentrated under a vacuum at 100° C. to remove dimethyl sulphoxide. The residue thus obtained is mixed with a mixture of 50 ml of water and 50 ml of toluene for half an hour. Filtration by suction gives 900 mg of the alternating copolymer in accordance with formula XVII of FIG. 5. The conductivity at room temperature is $10^{-5}$ S/cm and $2.5 \cdot 10^{-3}$ S/cm at 250° C. The band gap is 0.5 eV.

EXAMPLE 3

Alternating copolymer of squaric acid and the compound in accordance with formula VI, where $R_1 = R_2 = n-C_4H_9$.

In a manner analogous to that described in Example 1, the compound is prepared in accordance with formula VI of FIG. 3, where $R_1 = R_2 = n-C_4H_9$ (n-butyl). In a manner analogous to that of said exemplary embodiment, an alternating copolymer is obtained by using squaric acid. The conductivity of the copolymer formed is $5.10^{-5}$ S/cm. After doping with iodine vapor at a temperature of 80° C. the conductivity is $10^{-2}$ S/cm.

EXAMPLE 4 to 5

The Table below gives a summary of the results of alternating copolymers obtained from the indicated acceptor monomer units A and donor monomer units D. The conductivity is measured on the undoped copolymer at room temperature.

| Example No. | monomer A | monomer D | conductivity copolymer (S/cm) | band gap (eV) |
|---|---|---|---|---|
| 4 | squaric acid | VI where $R_1 = R_2 = CH_3$ | $10^{-8}$ | 1.0 |
| 5 | squaric acid | VI where $R_1 = R_2 = C_4H_9$ | $3.10^{-6}$ | 1.0 |
| 6 | squaric acid | VI where $R_1 = R_2 = C_{18}H_{37}$ | $3.10^{-5}$ | 1.0 |
| 7 | croconic acid | VI where $R_1 = R_2 = CH_3$ | $2.10^{-8}$ | |
| 8 | squaric acid | VII where $R_3 = R_4 = C_4H_9$ | $5.10^{-7}$ | |
| 9 | croconic acid | VII where $R_3 = R_4 = CH_3$ | $10^{-5}$ | 0.5 |
| 10 | croconic acid | VII where $R_3 = CH_3$ and $R_4 = C_{12}H_{25}$ | $10^{-4}$ | |
| 11 | squaric acid | neocuproine (VIII) | $2.10^{-7}$ | |
| 12 | squaric acid | terthienyl (IX) with $R_5 = H$ | $2.10^{-6}$ | |
| 13 | croconic acid | p-phenylenediamine | $10^{-8}$ | |
| 14 | squaric acid | diamino acridine (XV) | $10^{-4}$ | |
| 15 | squaric acid | thionine (XVI) | $2.10^{-6}$ | |

Alternating copolymers in accordance with the invention are intrinsically electrically conductive and have a band gap of maximally 1.5 eV.

We claim:

1. A (semi)conductive copolymer of alternating donor and acceptor monomer units, characterized in that the (semi)conductive copolymer is obtained by reacting an acceptor monomer unit A having an unsaturated ring structure which is substituted with at least two double-bonded oxygen atoms and at least one hydroxy group, with a donor monomer unit D formed by a homo or heterocyclic aromatic compound comprising at least two active hydrogen atoms, a polycondensation reaction taking place in the presence of a solvent, thereby forming said alternating (semi)conductive copolymer substantially free of doping, with the proviso that said monomer unit A is selected from the group consisting of croconic acid and 5,6-dihydroxy-5-cyclohexene-1,2,3,4-tetraone when said monomer unit D is p-phenylenediamine.

2. An alternating copolymer as claimed in claim 1, characterized in that the monomer unit A is selected from the group consisting of squaric acid, croconic acid and 5,6-dihydroxy-5-cyclohexene-1,2,3,4-tetraone.

3. A method of preparing an alternating copolymer as claimed in claim 2, wherein equimolor quantities of bifunctional acceptor monomer units A and bifunctional donor monomer units D are mixed in a solvent and polymerized by polycondensation, thereby forming the alternating copolymer comprising repeating unit AD.

4. An alternating copolymer as claimed in claim 1, characterized in that the monomer unit D is selected from the group consisting of

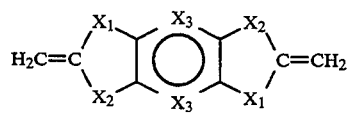
IVA

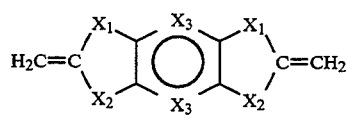
IVB

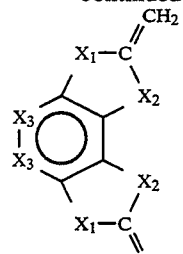
VA

VB

VC where:
$X_1 = $ —NR— and
$X_2 = O$, S, Se, —NR—, —CR=CH—, —CHR—CH$_2$— or —C(alkyl)$_2$—, where the alkyl group contains 1-8 C-atoms and
$X_3 = $ —CR= or —N=, where R is and H-atom or a $C_1$-$C_{18}$ alkyl or alkoxy group; or
$X_1 = S$ or O and
$X_2 = $ or —CR=CH— and
$X_3 = $ —CR= or —N=, where R has the above-mentioned meaning.

5. A method of preparing an alternating copolymer as claimed in claim 4, wherein equimolor quantities of bifunctional acceptor monomer units A and bifunctional donor monomer units D are mixed in a solvent and polymerized by polycondensation, thereby forming the alternating copolymer comprising repeating unit AD.

6. An alternating copolymer as claimed in claim 4, characterized in that the monomer unit D is selected from the group consisting of

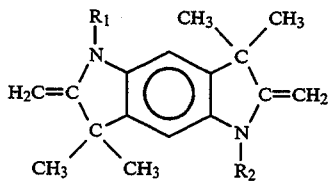

where $R_1$ and $R_2$ are each $C_1$-$C_{18}$ alkyl group;

VI

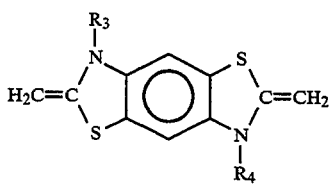

where $R_3$ and $R_4$ are each $C_1$-$C_{18}$ alkyl group;

VII

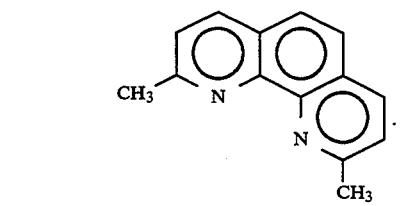

VIII

7. A method of preparing an alternating copolymer as claimed in claim 3, wherein equimolor quantities of bifunctional acceptor monomer units A and bifunctional donor monomer units D are mixed in a solvent and polymerized by polycondensation, thereby forming the alternating copolymer comprising repeating unit AD.

8. An alternating copolymer as claimed in claim 6, characterized in that the monomer unit A is croconic acid and the monomer unit D corresponds to formula VII, where $R_3$ represents a methyl group and $R_4$ represents a dodecyl group.

9. A method of preparing an alternating copolymer as claimed in claim 8, wherein equimolor quantities of bifunctional acceptor monomer units A and bifunctional donor monomer units D are mixed in a solvent and polymerized by polycondensation, thereby forming the alternating copolymer comprising repeating unit AD.

10. An alternating copolymer as claimed in claim 1, characterized in that the monomer unit A is selected from the group consisting of croconic acid and 5,6-dihydroxy-5-cyclohexene-1,2,3,4-tetraone and the monomer unit D is an aromatic diamine of the general formula

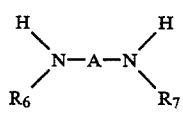

X where $R_6$ and $R_7$ represent an H-atom or a $C_1$-$C_{18}$ alkyl group and A is an aromatic core selected from the group consisting of

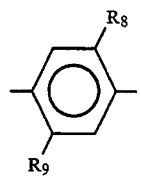

XI

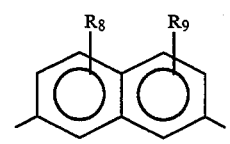

XII

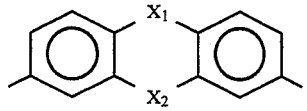

XIII where $R_8$ and $R_9$ represent an H-atom or a $C_1$-$C_{18}$ alkyl group and $X_1$=—N= or —CR=, where R represents an H-atom or a $C_1$-$C_{18}$ alkyl or alkoxy group, and $X_2$=S, O, Se, —NH— or —N(alkyl)—, where the alkyl group contains 1–18 C-atoms.

11. A method of preparing an alternating copolymer as claimed in claim 10, wherein equimolor quantities of bifunctional acceptor monomer units A and bifunctional donor monomer units D are mixed in a solvent and polymerized by polycondensation, thereby forming the alternating copolymer comprising repeating unit AD.

12. An alternating copolymer as claimed in claim 10, characterized in that the monomer unit D is selected from the group consisting of p-phenylenediamine, thionine and 3,6-diamino acridine.

13. A method of preparing an alternating copolymer as claimed in claim 12, wherein equimolor quantities of bifunctional acceptor monomer units A and bifunctional donor monomer units D are mixed in a solvent and polymerized by polycondensation, thereby forming the alternating copolymer comprising repeating unit AD.

14. An electronic circuit which comprises an alternating copolymer as claimed in claim 1.

15. An electronic circuit as claimed in claim 14 in which said copolymer is present as a semiconductor element.

16. An antistatic layer which comprises an alternating copolymer as claimed in claim 1.

17. An electromagnetic protective layer which comprises an alternating copolymer as claimed in claim 1.

18. An alternating copolymer as claimed in claim 1, wherein the monomer unit A is squaric acid and the monomer unit D is an aromatic diamine of the general formula

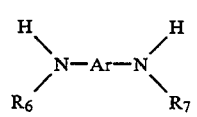

X where $R_6$ and $R_7$ represent a $C_1$-$C_{18}$ alkyl group and Ar is an aromatic core selected from the group consisting of

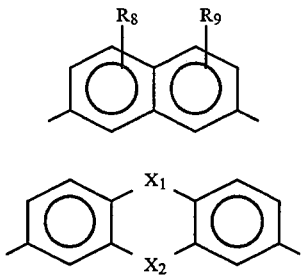                                                    XII

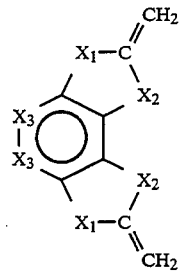   VA

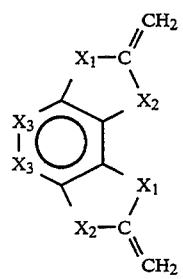   VB

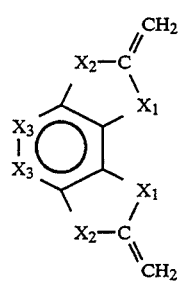   VC where R₈ and R₉ represent an H-atom or a $C_1$–$C_{18}$ alkyl group and $X_1 = -N=$ or $-CR=$, where R represents an H-atom or a $C_1$–$C_{18}$ alkyl or alkoxy group, and $X_2 = S$, O, Se, —NH— or —N (alkyl)—, where the alkyl group contains 1–18 C-atoms.

19. A method of preparing an alternating copolymer as claimed in claim 18 wherein equimolor quantities of bifunctional acceptor monomer units A and bifunctional donor monomer units D are mixed in a solvent and polymerized by polycondensation, thereby forming the alternating copolymer comprising repeating unit AD.

20. An alternating copolymer as claimed in claim 18, characterized in that the monomer unit D is selected from the group consisting of thionine and 3,6-diamino acridine.

21. A method of preparing an alternating copolymer as claimed in claim 20 wherein equimolor quantities of bifunctional acceptor monomer units A and bifunctional donor monomer units D are mixed in a solvent and polymerized by polycondensation, thereby forming the alternating copolymer comprising repeating unit AD.

22. A method of preparing an alternating copolymer as claimed in claim 1, in which equimolar quantities of bifunctional acceptor monomer units A and bifunctional donor monomer units D are mixed in a solvent and polymerized by polycondensation, thereby forming the alternating copolymer comprising repeating unit AD.

23. A (semi)conductive copolymer of alternating donor and acceptor monomer units, characterized in that the (semi)conductive copolymer is obtained by reacting an acceptor monomer unit A selected from the group consisting of squaric acid, croconic acid and 5,6-dihydroxy-5-cyclohexene-1,2,3,4-tetraone with a donor monomer unit D selected from the group consisting of

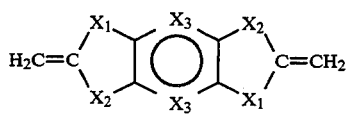   IVA

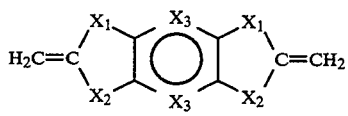   IVB where:

$X_1 = -NR-$ and $X_2 = O$, S, Se, —NR—, —CR=CH—, —CHR—CH₂— or —C(alkyl)₂—, where the alkyl group contains 1–18 C-atoms and $X_3 = -CR=$ or $-N=$, where R is an H-atom or a $C_1$–$C_{18}$ alkyl or alkoxy group; or $X_1 = S$ or O and $X_2 =$ or —CR=CH— and $X_3 = -CR=$ or $-N=$, where R has the above-mentioned meaning, a polycondensation reaction taking place in the presence of a solvent, thereby forming said alternating (semi)conductive copolymer substantially free of doping.

24. A method of preparing an alternating copolymer as claimed in claim 23 wherein equimolor quantities of bifunctional acceptor monomer units A and bifunctional donor monomer units D are mixed in a solvent and polymerized by polycondensation, thereby forming the alternating copolymer comprising repeating unit AD.

25. A (semi)conductive copolymer of alternating donor and acceptor monomer units, characterized in that the (semi)conductive copolymer is obtained by reacting an acceptor monomer unit A selected from the group of squaric acid, croconic acid and 5,6-dihydroxy-5-cyclohexene-1,2,3,4-tetraone with a donor monomer unit D selected from an aromatic diamine of the general formula

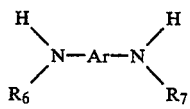

X where R₆ and R₇ represent an H-atom or a $C_1$-$C_{18}$ alkyl group and Ar is an aromatic core selected from the group consisting of

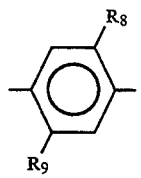

XI

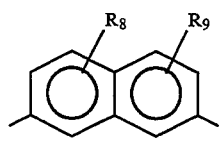

XII

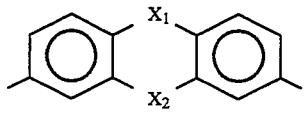

XIII where R₈ and R₉ represent an H-atom or a $C_1$-$C_{18}$ alkyl group and $X_1$=—N= or —CR=, where R represents an H-atom or a $C_1$-$C_{18}$ alkyl or alkoxy group, and $X_2$=S, O, Se, —NH— or —N (alkyl)—, where the alkyl group contains 1-18 C-atoms, with the proviso that said monomer unit A is selected from the group consisting of croconic acid and 5,6-dihydroxy-5-cyclohexene-1,2,3,4-tetratone when said monomer unit D is p-phenylenediamine, a polycondensation reaction taking place in the presence of a solvent, thereby forming said alternating (semi)conductive copolymer substantially free of doping.

26. A method of preparing an alternating copolymer as claimed in claim 25 wherein equimolor quantities of bifunctional acceptor monomer units A and bifunctional donor monomer units D are mixed in a solvent and polymerized by polycondensation, thereby forming the alternating copolymer comprising repeating unit AD.

27. An alternating copolymer as claimed in claim 25 wherein the monomer unit D is selected from the group consisting of p-phenylenediamine, thionine and 3,6-diamino acridine.

28. A method of preparing an alternating copolymer as claimed in claim 27 wherein equimolor quantities of bifunctional acceptor monomer units A and bifunctional donor monomer units D are mixed in a solvent and polymerized by polycondensation, thereby forming the alternating copolymer comprising repeating unit AD.

* * * * *